US006782756B2

(12) United States Patent
Muchow et al.

(10) Patent No.: US 6,782,756 B2
(45) Date of Patent: Aug. 31, 2004

(54) MICROMECHANICAL COMPONENT AND EQUALIZATION METHOD

(75) Inventors: Joerg Muchow, Pliezhausen (DE); Jochen Franz, Reutlingen (DE); Uwe Lipphardt, Sonnenbuehl (DE); Andreas Duell, Stuttgart (DE); Wolfgang Romes, Engstingen (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 10/239,470

(22) PCT Filed: Mar. 15, 2001

(86) PCT No.: PCT/DE01/00992

§ 371 (c)(1), (2), (4) Date: Jan. 9, 2003

(87) PCT Pub. No.: WO01/70625

PCT Pub. Date: Sep. 27, 2001

(65) Prior Publication Data

US 2003/0150253 A1 Aug. 14, 2003

(30) Foreign Application Priority Data

Mar. 21, 2000 (DE) ........................................ 100 13 904

(51) Int. Cl.[7] ................................................. G01L 9/00
(52) U.S. Cl. .............................. 73/754; 73/708; 73/719
(58) Field of Search .......................... 73/708, 719, 725, 73/734, 746, 750, 754

(56) References Cited

U.S. PATENT DOCUMENTS 4,333,349 A * 6/1982 Mallon et al. ................ 73/708
4,622,856 A * 11/1986 Binder et al. ................. 73/727
4,682,503 A * 7/1987 Higashi et al. ............... 73/755
4,726,232 A 2/1988 Koneval
5,537,882 A 7/1996 Ugai et al.
6,234,027 B1 * 5/2001 Schatz ......................... 73/754

FOREIGN PATENT DOCUMENTS

| | | |
|---|---|---|
| DE | 34 19 710 | 11/1984 |
| DE | 197 01 055 | 7/1998 |
| DE | 199 24 061 | 12/1999 |
| JP | 08 086671 | 4/1996 |

OTHER PUBLICATIONS

J. Dziuban et al. "Self Compensating Piezoresistive Pressure Sensor". Sensors and Acuators A. vol. A42. No. 1/3. pp. 368–374.*

* cited by examiner

*Primary Examiner*—Edward Lefkowitz
*Assistant Examiner*—Andre Allen
(74) *Attorney, Agent, or Firm*—Kenyon & Kenyon

(57) ABSTRACT

A micromechanical component, in particular a pressure sensor, including a substrate that has a membrane region, a surrounding region of the membrane region, at least one measuring resistance provided in the membrane region and modifiable by deformation of the membrane region, and a corresponding evaluation circuit provided in the surrounding region. An interference effect on the measuring resistance is producible by way of a deformation of parts, in particular conductor paths, of the evaluation circuit relative to the substrate. The invention also creates a corresponding equalization method on a test chip or as an individual final equalization.

12 Claims, 5 Drawing Sheets

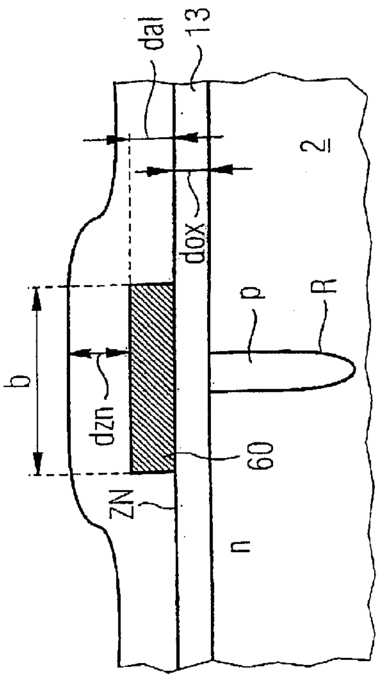
FIG 4
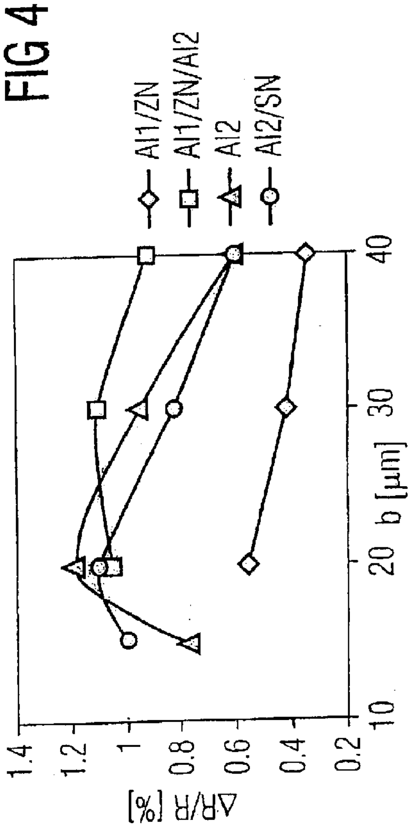
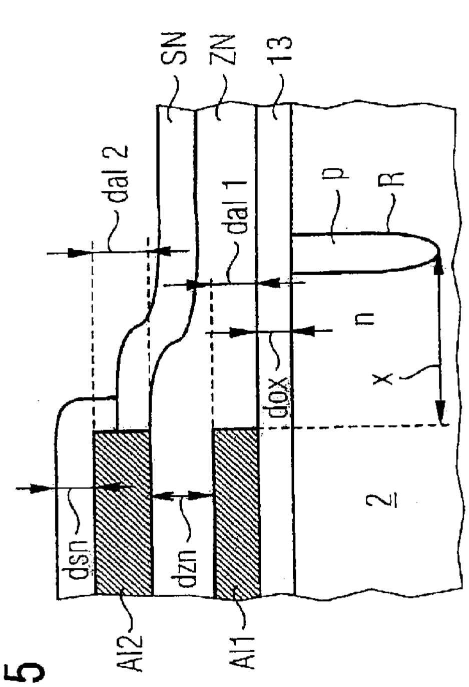
FIG 5
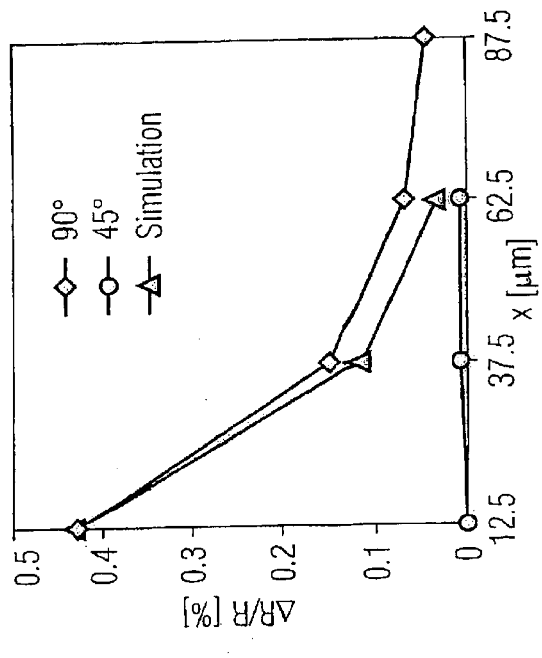

MICROMECHANICAL COMPONENT AND EQUALIZATION METHOD

FIELD OF THE INVENTION

The present invention concerns a micromechanical component, in particular, a pressure sensor and a corresponding equalization method.

Although applicable to any micromechanical components, the present invention will be explained with reference to example embodiments of a micromechanical pressure sensor.

BACKGROUND INFORMATION

German Patent Application 197 01 055 A1 describes a semiconductor pressure sensor for measuring an externally applied pressure. FIG. 7 shows a plan view of this conventional pressure sensor. A sectioned drawing of this pressure sensor along section line A–A' is shown in FIG. 8. The pressure sensor is manufactured on a substrate 2 made of silicon which has a [100] orientation. Located on the underside of a membrane 10 is a depression in the shape of a truncated pyramid. Its configuration is such that at the location of the truncated pyramid, only a small residual thickness of silicon material (membrane 10) remains. The delimiting lines of the truncated pyramid are drawn with dashes in FIG. 7 and run parallel to the [110] and [1I 0] directions, whose orientation is indicated in FIG. 7 with arrows 40 and 41. The portion of silicon substrate 2 that is not thinned is also called support 11.

A measuring resistance 4 that extends in the [110] direction is located on membrane 10 close to the membrane edge. Two electrodes 6, which are made of vacuum-deposited aluminum in the exemplified embodiment selected here, are located on support 11; one electrode is configured in front of and one behind measuring resistance 4, as a respective elongated metallization extending perpendicular to measuring resistance 4. A compensating resistance 5 is located at the left electrode, extending perpendicular to the direction of measuring resistance 4 in the [1I0] direction. Compensating resistance 5 is connected at one end to measuring resistance 4 via a connecting conductor 7, and at its other end to electrode 6 via a second connecting conductor 7. Double arrows 30 and 31 indicate mechanical stresses that are relevant in terms of explaining the manner of operation of this conventional pressure sensor with hysteresis balancing.

FIG. 8 shows a cross section through the pressure sensor of FIG. 7. Substrate 2 has a depression that is trapezoidal in cross section and is delimited by support 11 and membrane 10. Measuring resistance 4 is located in the surface of membrane 10. Measuring resistance 4 is implemented by introducing a local doping zone into the silicon material.

The manner of operation of the conventional pressure sensor with hysteresis balancing is as follows. The pressure sensor is mechanically deformed by a pressure acting externally on the pressure sensor. The thickness of support 11 is typically several hundreds of micrometers, whereas the thickness of membrane 10 is typically several micrometers. Because of the resulting difference in stiffness, the mechanical deformation in support 11 is negligible compared to the mechanical deformation in the membrane. The mechanical stress or deformation resulting from the externally applied pressure is illustrated by an arrow 31, whose length is an indication of the deformation. The mechanical deformation is depicted by way of example at a point, namely at the location of measuring resistance 4.

Also present in the pressure sensor is a first deformation 30 whose cause is a mechanical interference stress which in the present case is based on the differing coefficients of thermal expansion of the aluminum of the electrodes and the silicon of substrate 2. A first mechanical stress or deformation 30 of this kind can be associated with each point in the pressure sensor, but only two points in the pressure sensor will be considered. These two points are assumed to be the location of measuring resistance 4 and the location of compensating resistance 5. In the example embodiment selected here, it is assumed that first deformation 30 is identical everywhere.

Measuring resistance 4 and compensating resistance 5 are dimensioned so that their piezoresistive coefficients are of identical magnitude. The absolute electrical resistance values are also assumed to be identical under identical external conditions. The changes in electrical resistance in measuring resistance 4 and in compensating resistance 5 as a result of first deformation 30 are thus of identical magnitude. Because one resistance is positioned in the direction of the deformation and one perpendicular to the deformation, the two changes in resistance have different signs. The total change in resistance resulting from first deformation 30 in the equivalent resistance for the series circuit made up of measuring resistance 4 and compensating resistance 5 is therefore zero. All that remains, therefore, is the change in the measuring resistance as a result of second deformation 31, to which compensating resistance 5 (located on support 11) is not exposed.

The conventional approach to compensating for hysteresis described above has proven to be disadvantageous in that it exhibits only low efficiency and results in a loss of sensitivity.

In the conventional integrated micromechanical pressure sensor, without compensation a hysteresis of the output signal over temperature therefore generally occurs at the converter element. The hysteresis is generally brought about by a plastic deformation of the aluminum conductor paths of the evaluation circuit, which are located in the surrounding region on support 11. If the sensor element is heated to above $\Delta T=60$ degrees C., the differing coefficients of thermal expansion of aluminum and the silicon substrate cause mechanical stresses of 100 MPa to occur in the aluminum. Above these stress levels, the aluminum begins to flow. Upon cooling, the same happens in the opposite direction.

FIG. 9 illustrates this hysteresis of the mechanical stress as a function of temperature, and FIG. 10 shows the hysteresis of a further conventional pressure sensor without compensation as a function of membrane edge length mk, for various circuit inner radii SIR. In contrast to the example above, it is assumed here that the circuit conductor paths of the evaluation circuit completely enclose the membrane. The chip size is 4 mm. The global effect predominates in the negative hysteresis region, and the edge effect in the positive hysteresis region.

The hysteretic behavior of the overall aluminum wiring of the evaluation circuit has an integral remote effect on the piezoresistances of the converter element, specifically by way of a "bimetallic deformation" (aluminum layer on silicon) of the overall sensor element (global effect), and by way of a local effect when the distance from the circuit edge to the piezoresistance is less than 100 micrometers (edge effect).

Depending on the geometric layout, either the global effect or the edge effect predominates. The influencing variables are:

a) Distance from membrane edge to edge of evaluation circuit;
b) Membrane size;
c) Chip geometry;
d) Glass thickness, cut width of glass saw;
e) Glass size;
f) Solder thickness, adhesive thickness, and mounting substrate.

In sensors soldered on the back side, the hysteresis of the solder partially counteracts the influences caused by the top side of the chip (i.e., aluminum wiring of the circuit). The hysteresis of the solder should therefore be taken into account for absolute hysteresis calculation.

Four measuring resistances are conventionally provided for the micromechanical pressure sensor, and are located (depending on type) in the region in which the edge effect or global effect is dominant. They are connected into a Wheatstone bridge whose output signal consequently also exhibits a temperature hysteresis. This temperature hysteresis overlies the actual sensor signal.

SUMMARY

The micromechanical component according to the present invention exhibits a high maximum compensation effect and a small minimum step size, as compared to conventional approaches.

It may be possible to compensate for hysteresis levels exceeding 5% (both positive and negative) at the pressure converter element. The minimum step size may be 0.1% hysteresis.

This may occur without sensitivity loss, or only a minimizable sensitivity loss. Cross-coupling to the measuring resistance may be prevented. Lastly, the compensation function may be easily integrated into the circuit. Equalization by way of mask programming may be provided for. As an alternative, optimum compensation may be established on a precursor article.

The present invention provides, in the surrounding region and/or in the membrane region, at least one patch which may be made of a material such that by way of a deformation of the patch or patches relative to the substrate, an analog interference effect may be generated in such a way that the interference effect acting on the measuring resistance may be compensated for.

According to an example embodiment, a compensating resistance device may be provided which may be configured such that one or more compensating resistances may be additionally connected to the measuring resistance, respective patches being provided in the region of the compensating resistances. A positive or negative hysteresis may be counteracted by additionally connecting one or more compensating resistances.

According to another example embodiment, additional connection of the compensating resistance or resistances may be performed selectably, so that from a defined number of compensating resistances, a specific combination that may be additionally connected to the measuring resistance may be selected. This structure may allow the exact compensation effect to be ascertained by severing conductor paths on the completely configured sensor. The structure may also be designed so that a specific compensation effect may be established by way of a mask change.

"Selectively additionally connectable" means that a connection may be interrupted by severing conductor paths, or a connection may be created by short-circuiting conductor paths. This may be effected, e.g., by way of burnout segments (such as, with a laser or voltage pulse) or by thyristor zapping. Individual end-of-line equalization for high-precision requirements may thus be possible.

According to another example embodiment, one or more patches that act directly on the measuring resistance may be provided in the membrane region.

According to another example embodiment, one or more patches, for example, annular patches, which may be located in the surrounding region between the membrane edge and the circuit inner radius of the evaluation circuit, may be provided. A negative hysteresis may be compensated for by way of the global effect that may be controllable in this fashion. Compensating resistances may not be needed in this case. The "circuit inner radius" means the step between the circuit region and the surrounding region (e.g., A1 step).

According to another example embodiment, the material of the patches may be the conductor path material of the evaluation circuit.

According to another example embodiment, the patches may be located above or alongside an associated compensating resistance.

According to another example embodiment, the substrate material may be silicon and the conductor path material may be aluminum.

BRIEF DESCRIPTION OF THE DRAWINGS

FIG. 4 illustrates the relative hysteretic resistance change for a temperature loop from −40 to 140 degrees C. of the aluminum patch lying above the compensating resistance in a long strip in the current direction.

FIG. 5 illustrates the relative hysteretic resistance change for a temperature loop from −40 to 140 degrees C. of the aluminum patch lying alongside the compensating resistance in a long strip in the current direction.

DETAILED DESCRIPTION

Figure 1:
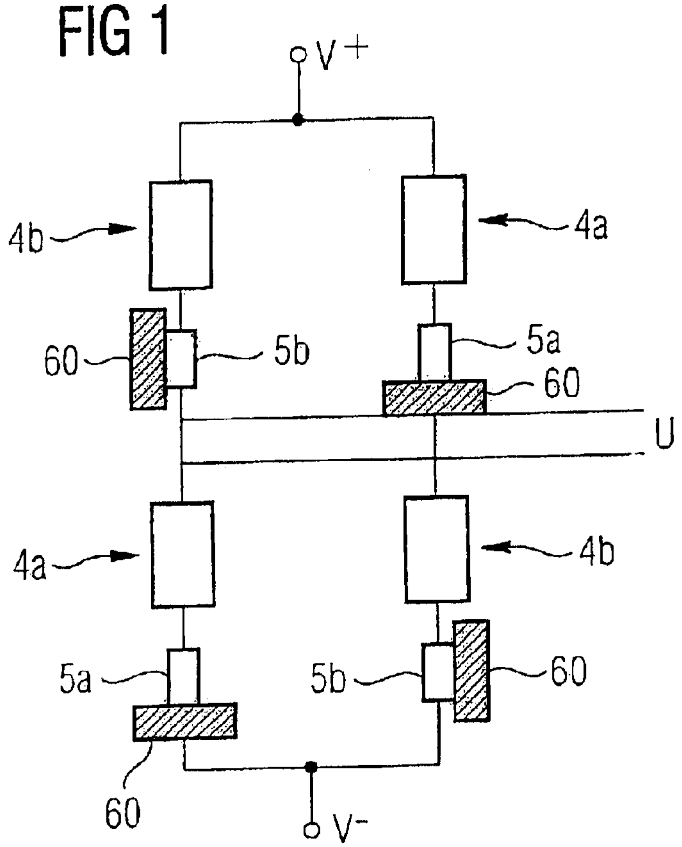
FIG. 1 illustrates a portion of an example embodiment of a micromechanical pressure sensor according to the present invention.

In the Figures, identical reference characters denote identical or functionally identical elements.

In FIG. 1, 4*a* designates two longitudinal measuring resistances, 4*b* designates two transverse measuring resistances, 60 designates patches made of conductor path material (in this example embodiment, aluminum), 5*a* designates two compensating resistances of the transverse measuring resistances, and 5*b* designates two compensating resistances of the longitudinal measuring resistances. V+ and V− designate supply potentials and U designates an output voltage signal.

FIG. 1 is a schematic illustration of a first example embodiment of a circuit arrangement according to the present invention, where measuring resistances 4*a,* 4*b* may be located on the membrane whereas compensating resistances 5*a,* 5*b,* and associated patches 60, may be positioned on the surrounding region.

The first example embodiment compensates for the hysteresis of the micromechanical pressure sensor by integrating compensating resistances 5*a,* 5*b* into the connecting line of measuring resistances 4*a,* 4*b* (approx. 80 micrometers outside the membrane). The compensating resistances may be, for example, piezo-sensitive resistances of typically 200 ohms/square (size approx. 1 square, resistance approx. 200 ohms), that may be connected in series with the measuring resistances. Aluminum patches 60 may be located at a lateral spacing of typically 10 to 30 micrometers, perpendicular to compensating resistances 5*a* and longitudinally with respect to compensating resistances 5*b*.

Located between the resistance level in the substrate and the aluminum level, there may be an insulation level, e.g., a $SiO_2$ layer, that may have contact holes only at desired points and thus may prevent unintentional short circuits.

Depending on the location of aluminum patches 60 with respect to compensating resistances 5*a,* 5*b,* the hysteretic stress difference may act perpendicular or parallel to the current direction. Since the longitudinal and transverse piezo coefficients have different signs, it is thereby possible to generate both positive and negative hystereses at compensating resistances 5*a, b.* This is referred to here as "active hysteresis compensation."

The hysteresis intensity induced for compensation purposes may be modified by way of the distance of aluminum patches 60 from compensating resistance 5*a,* 5*b,* and their shape and size.

The structure illustrated in FIG. 1 may exhibit limited effectiveness, however; for example, the effectiveness may be dependent on the particular sensor type.

As a result of this active hysteresis compensation using 200-ohm piezo-sensitive compensating resistances, the measurement bridge loses 10% of its sensitivity. This may be critical, especially in the low-pressure range. The sensitivity loss may be compensated for by enlarging the membrane. This may result in an increase in nonlinearity, and may increases both costs and the risk of buckling. A compensation system that operates without sensitivity loss, or with the least possible sensitivity loss, may be preferable.

Figure 2A:
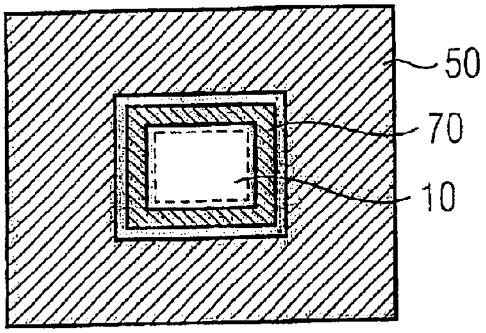
FIG. 2 illustrates a portion of an example embodiment of a micromechanical pressure sensor according to the present invention.
Figure 2B:
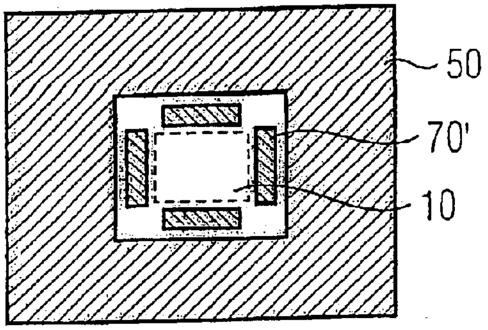

FIGS. 2*a* and 2*b* show a portion of a second example embodiment of a micromechanical pressure sensor according to the present invention. This second embodiment relates to a passive compensation system for negative hysteresis with no sensitivity loss.

In FIGS. 2*a* and 2*b,* 70 and 70' designate respective electrically inactive metal patches made of aluminum which may provide compensation utilizing the global effect.

Figure 10:
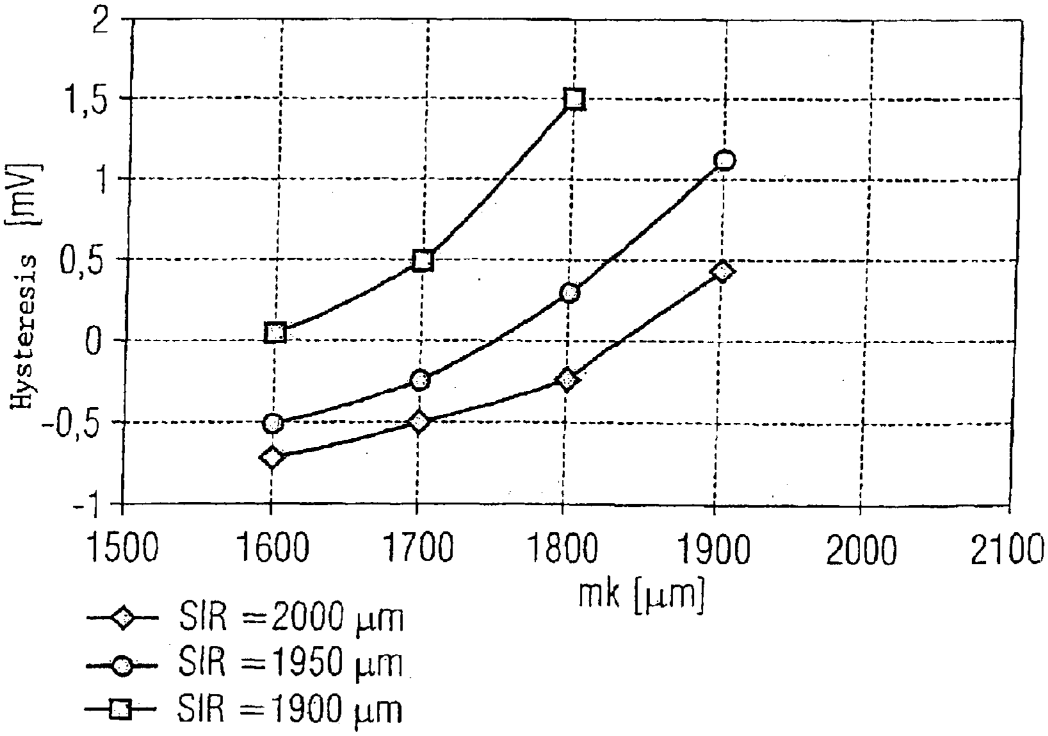
FIG. 10 illustrates the hysteresis of the output signal of a conventional pressure sensor as a function of membrane edge length, for various circuit inner radii.

If the spacing between the membrane edge and the circuit is greater than 100 micrometers, the baseline hysteresis may be negative (cf. FIG. 10). In this case the zero transition of the hysteresis may be implemented by way of an artificial decrease in the circuit inner radius. This may be achieved by way of the additional conductor path material patches 70, 70' at the edge of the circuit, which are electrically nonfunctional and are utilized exclusively because of their mechanical effect.

In the second embodiment, patches 70, 70' are present in the form of a ring and are located on the surrounding region of membrane 10, i.e., between the circuit inner radius and the membrane edge. The ring may be completely continuous (compensation ring 70) or may be concentrated at the centers of the membrane edges, since the effect may be greatest in this region (compensation ring 70'). In the latter case, there may be more room in the corners for evaluation circuit 50.

The passive compensation system presented in this example may have no influence on sensitivity. It may increase costs, however, since electrically inactive area may be consumed.

Alternatively, either a wide aluminum strip or many small strips may be used.

Although the influence of variation in the circuit inner radius may be great, the aluminum edge may be produced to an accuracy of 1 micrometer (defined by photographic technology) and the overall result may nevertheless be a very precise hysteresis compensation "adjustment screw."

Figure 3A:
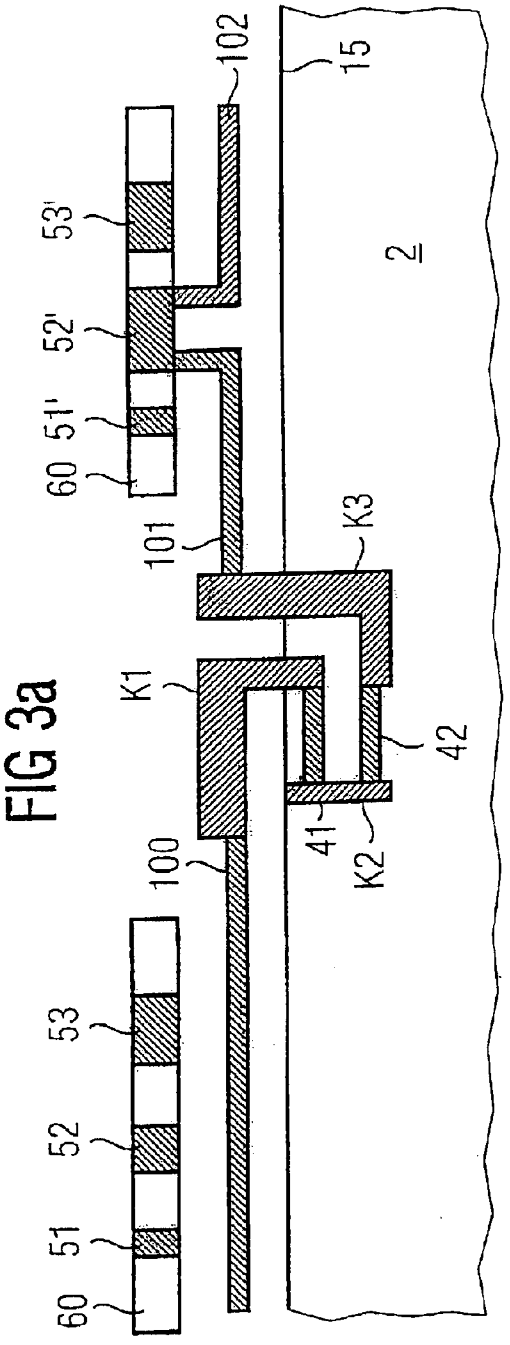
FIG. 3*a* illustrates a plan view of a portion of an example embodiment of a micromechanical pressure sensor according to the present invention.
Figure 3B:
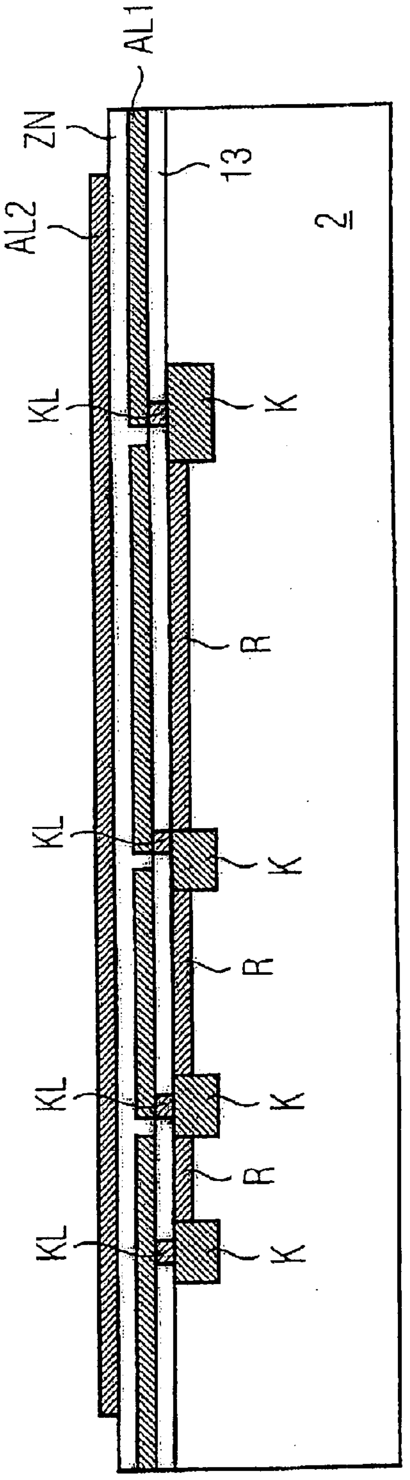
FIG. 3*b* illustrates a section view of a portion of an example embodiment of a micromechanical pressure sensor according to the present invention.

FIGS. 3*a* and 3*b* illustrate a portion of a micromechanical pressure sensor as an example embodiment according to the present invention. This third embodiment relates to a compensation system for positive hysteresis with the least possible sensitivity loss.

In FIGS. 3*a* and 3*b,* in addition to the reference characters already introduced, K1, K2, and K3 designate low-resistance connecting line regions introduced into the substrate; 41 and 42 designate measuring resistances; 100, 101, and 102 designate conductor paths made of aluminum; and 51, 52, 53, 51', 52', and 53' designate compensating resistances.

If the circuit inner radius is located so close to the edge that the hysteresis already lies in the positive region, an active hysteresis compensation system (i.e., compensating resistance connected to, e.g., in series with, the measuring resistance) may be activated. One exemplary arrangement is that in which the absolute value of the compensating resistance may be as small as possible, but the hysteresis of the resistance value may be as large as possible. Maximum compensation with minimum sensitivity loss may be thereby achieved.

In the first exemplified embodiment, the respective 200-ohm compensating resistance 5*a*, b may be permanently installed into the overall bridge. This may mean a sensitivity loss of 10% even in cases where the compensation may be not at all necessary, i.e. the relevant measuring resistance has no aluminum surrounding it.

The compensating resistances may be positioned so that they become integrated into the Wheatstone bridge only when compensation is actually necessary. The third exemplary embodiment may include respective series of compensating resistances 51, 52, 53 and 51', 52', 53' that can be connected, alternatively or together, in series with measuring resistances 41, 42. The resistance values may be, for example, 2×90 ohms (51, 51'), 2×180 ohms (52, 52'), and 2×360 ohms (53, 53'). This corresponds, e.g., to 0.5 square, 1 square, and 2 square of the baseline resistance. The total resistance to be activated may be selected in such a way that it is sufficient for compensation.

If these compensating resistances 51, 52, 53 or 51', 52', 53' are connected in series with a transverse measuring resistance 41, 42, they may possess a compensatory effect for hysteresis in the negative direction. In the present example embodiment, only the 180 ohm (1 square) compensating resistance 52' is connected. This may be done in the context of end-of-line measurement by removing superfluous conductor paths or adding desired ones (e.g. to create short circuits), or at the mask programming stage. In the latter case, precursor articles with test wafers may be used.

The aforementioned sign applies to the instance in which aluminum is present longitudinally above the resistance. If the aluminum is located next to the resistance, the result may be a compensatory effect in the positive direction (positive direction when compensating resistance is below aluminum in the longitudinal branch; negative direction when compensating resistance is alongside aluminum in longitudinal branch)

FIG. 3*b* schematically illustrates the layer structure of the example embodiment of FIG. 3*a*. Here K designates the connecting line region plane that is located in the region of the resistance plane. 13 is an insulator plane, AL1, a first conductor path plane, ZN, an intermediate nitride plane, and AL2, a second conductor plane for patches 60. Lastly, KL designates contact holes for connecting contact plane K to first conductor plane AL1. A topmost protective plane that may be made of nitride is not shown.

The AL1 conductor paths may be short-circuited as necessary, thereby deactivating the corresponding resistances. If the resistances are required only for their electrical effect, AL2 may be entirely removed and AL1 may be removed over the resistances but may remains as a contact connector.

Experiments have shown that it may be more favorable to place a long aluminum strip directly over the resistance, since the hysteretic mechanical stresses may be greater by a factor of 3 at the location of the resistance. It may thereby be possible to generate relative hysteretic resistance changes of 1–1.2%, in contrast to the structures with lateral aluminum coating, in which 0.3–0.4% may be achievable.

This is illustrated in FIGS. 4 and 5. FIG. 4 shows the relative hysteretic resistance change for a temperature loop from −40 to 140 degrees C., where the aluminum patch may lie above the compensating resistance in a long strip in the current direction. FIG. 5 shows the relative hysteretic resistance change for a temperature loop from −40 to 140 degrees C., where the aluminum patch may lie longitudinally alongside the compensating resistance in a long strip in the current direction.

In FIG. 4, in addition to the reference characters already introduced, b designates the width of the aluminum conductor path, $d_{zn}$ designates the thickness of the intermediate nitride, $d_{a1}$ designates the aluminum thickness, and $d_{ox}$ designates the thickness of the insulator (here $SiO_2$). Resistance, R, may be created here by p-type diffusion into an n-type substrate.

As is evident from the depiction of the relative resistance change ΔR/R (indicator of hysteresis) plotted against b for different layer arrangements, the achievable effect may have little dependency on b and may have a magnitude of up to 1.2%.

In FIG. 5, in addition to the reference characters already introduced, x designates the distance of the aluminum conductor path from resistance, R, $d_{sn}$ designates the thickness of the protective nitride, and $d_{al1/2}$ designates the aluminum thicknesses of the two conductor path layers.

As is evident from the depiction of the relative resistance change ΔR/R (indicator of hysteresis) plotted against b for different layer arrangements, at 90 degrees the achievable effect may depend greatly on x and may have a magnitude of only up to 0.45%. (The angles indicated refer to the angles formed by the compensating resistances with respect to the 100 direction, i.e., "90 degrees" means "parallel to the 110 direction.")

Calculation of the expected hysteresis is explained in more detail below.

An individual (e.g. longitudinal) resistance, $R_L$, comprising measuring resistance, $R_{Mess}$, and compensating resistance, $R_{comp}$, may be defined by:

$$R_L = R_{Mess} + R_{comp}. \tag{1}$$

Considering the temperature dependency of the semiconductor resistance and the piezo effect, the measuring resistance may be expressed as, $$R_{Mess} = R_{Mess}(T) + \frac{\Delta R_{Mess}}{R_{Mess}(T)} R_{Mess}(T), \tag{2}$$

where $R_{Mess}(T)$ describes the linear and quadratic temperature profile of the baseline resistance, $$R_{Mess}(T) = R_0 + TKR*\Delta T + TK2R*\Delta T^2, \tag{3}$$

and TKR and TKR2 are corresponding constants.

$\Delta R_{Mess}$ results from the piezo effect:

$$\frac{\Delta R_{Mess}}{R_{Mess}(T)} = \pi_L \sigma_L \text{ where temp. = const.} \tag{4}$$

This variable may be accessible instrumentally, and the change may be on the order of approx. 2%. $R_{Mess}(T)$ changes by approx. 20% over the entire temperature profile.

The mechanical stress, $\sigma_L$, may be brought about by the compressive deformation, $\sigma_L(p)$, of the membrane under a pressure, p, and by thermally induced deformations $\sigma_L(T)$. The resulting equation is:

$$\sigma_L = \sigma_L(p) + \sigma_L(T) \tag{5}$$

A similar equation governs the transverse resistance, $R_T$.

The equation for the compensating resistance, $R_{comp}$, is, $$R_{comp} = R_{comp}(T) + \frac{\Delta R_{comp}}{R_{comp}(T)} R_{comp}(T), \tag{6}$$

where, $$\frac{\Delta R_{comp}}{R_{comp}(T)} = \pi_L \sigma_T.$$

The mechanical stress with rising temperature may be perpendicular to the current direction if the metal strip covers the resistance longitudinally. In contrast to the measuring resistance, only one temperature dependency may exist, i.e.:

$$\sigma_T = \sigma_T(T). \tag{7}$$

As stated by the equation, $$U_{out} = U_{Vers} \frac{\left(1 + \frac{\Delta R_T}{R_T}\right)^2 - \left(1 + \frac{\Delta R_L}{R_L}\right)^2}{\left(2 + \frac{\Delta R_T}{R_T} + \frac{\Delta R_L}{R_L}\right)^2}, \tag{8}$$

a difference between the transverse and longitudinal resistance may cause a signal at the bridge output. In order to compensate the hysteresis to zero, the transverse and longitudinal resistances may possess the same hysteresis over temperature. The hysteresis without compensation resulting from equation (8) is depicted in FIG. 10.

The effect of the compensation structure was calculated using the equations provided above, entering hysteretic mechanical stresses based on exemplary simulations. A value of 0.2 MPa was used at the location of the measuring resistances. This results, by calculation, in a bridge hysteresis of 0.5%. A remanent stress of 10 MPa (simulations) was assumed for the location of the compensating resistances, i.e. beneath Al1 and Al2. This results, by calculation, in a hysteresis of 0.5%. The mechanical stresses due to pressure-related membrane deformation were also ascertained by simulation, and are on the order of 30 MPa. The pressure dependency of the hysteresis was also taken into account in the simulations. This pressure dependency may cause the hysteresis curves to spread apart. The result in the calculated example was a compensating resistance per branch of 140 ohms in order to push the total hysteresis below 1 mV.

Although a 140-ohm resistance may not directly exist in the arrangement as shown in FIG. 3*a,* it may be achieved approximately by a combination in which a 90-ohm resistance may be incorporated into the branch of one transverse resistance, and a 180-ohm resistance into the branch of the second transverse resistance.

In the example, it was initially assumed that both the Al1 and the Al2 plane are used. In this case, the maximum achievable hysteretic stress (remanent stress) beneath the aluminum strips, i.e., at the location of the compensating resistance, was 10 MPa. If only the Al1 plane is used, the stress may be approx. one-third of that value. This corresponds to a relative hysteretic resistance change of 0.3–0.4%, as opposed to 1–1.2% if the Al1 and Al2 planes are used.

Therefore, if only the Al1 plane is placed over the compensating resistances, the compensation effect may be reduced to a third; the most-precise compensation effect may be less than 0.1% of the bridge hysteresis.

If the 90-ohm as well as the 180-ohm and 360-ohm resistances are activated before each transverse resistance in both branches, a potential compensation effect of 4.5% bridge hysteresis may be possible.

In order to ensure symmetry of the bridge (offset), a corresponding resistance may be additionally connected in the branch of the longitudinal resistance. This resistance is not, however, equipped with a metal surround. Electrical symmetry may thus result.

A further increase in the compensation effect may of course be achieved if the compensating resistances of the longitudinal measuring resistances are designed with metal strips lying laterally alongside them. Since the effect, as stated above, may be less by a factor of approx. 3, an increase in the potential total compensation from 4.5% to 6% may be thereby possible.

Figure 6:
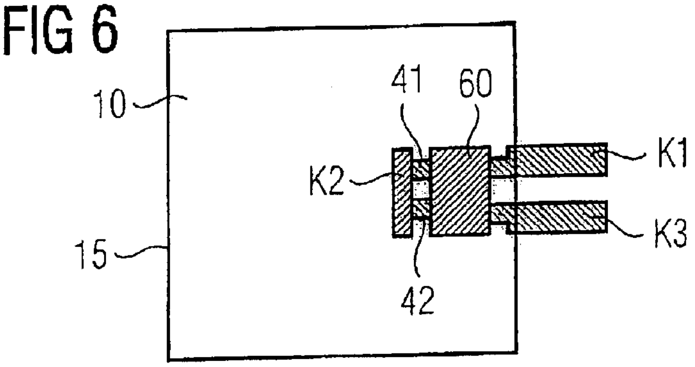
FIG. 6 illustrates a portion of an example embodiment of a micromechanical pressure sensor according to the present invention.
Figure 7:
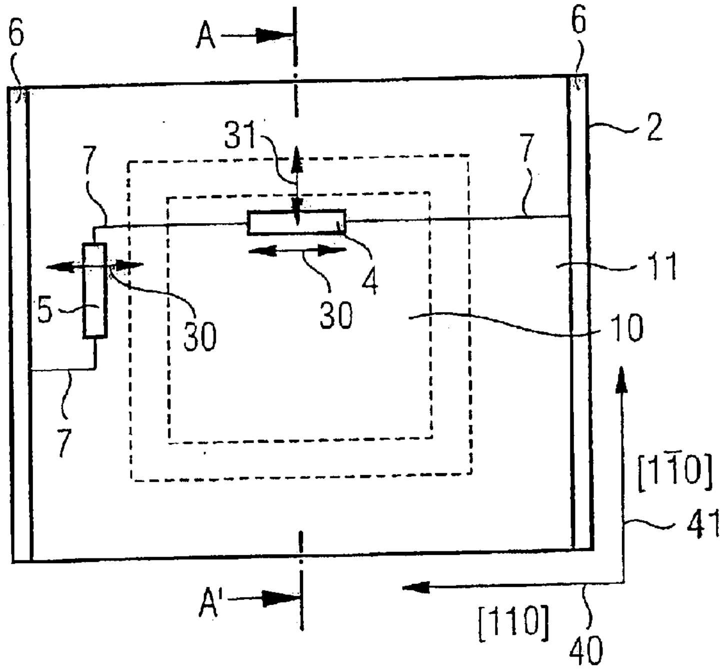
FIG. 7 illustrates a plan view of a conventional pressure sensor.
Figure 8:
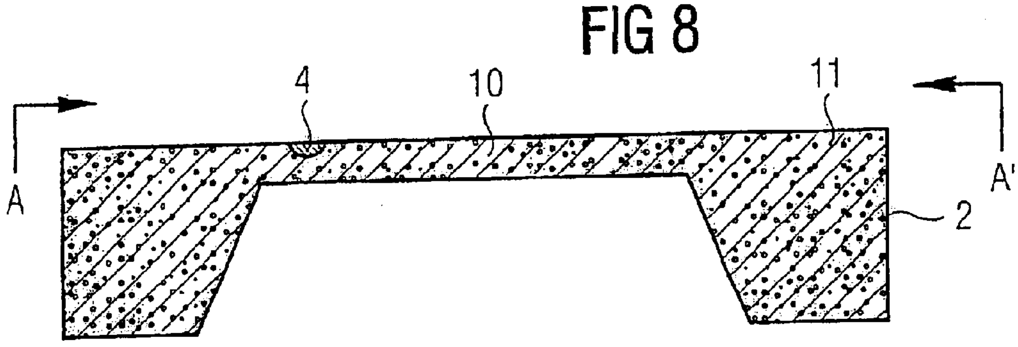
FIG. 8 illustrates a section through the conventional pressure sensor illustrates in FIG. 7.
Figure 9:
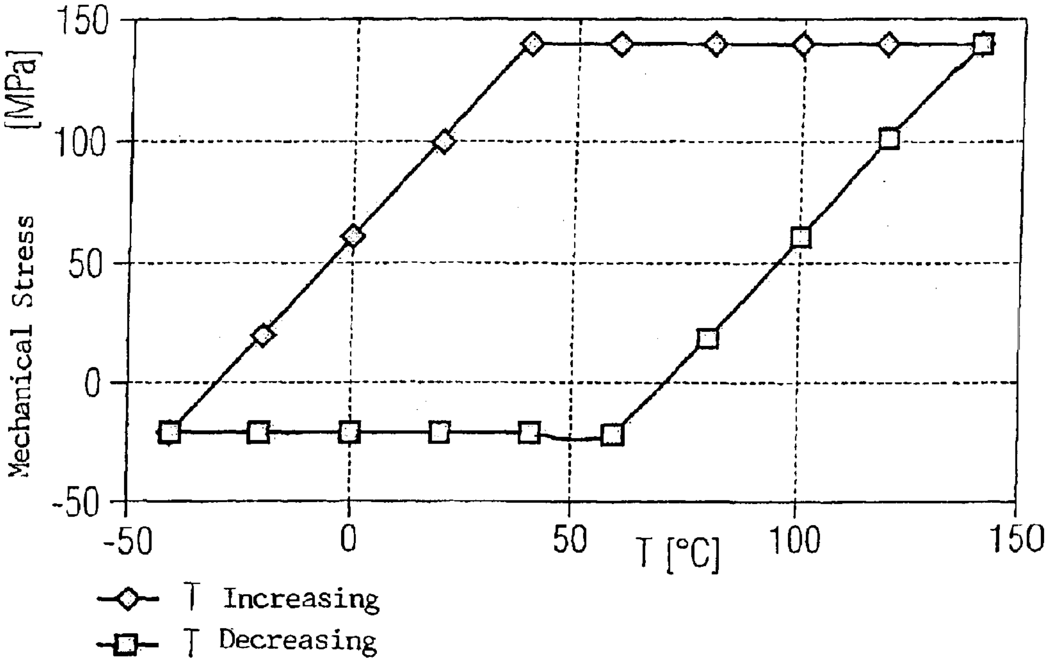
FIG. 9 illustrates the hysteresis of the mechanical stress as a function of temperature in a conventional pressure sensor.

FIG. 6 shows a portion of a fourth example embodiment of a micromechanical pressure sensor according to the present invention.

In this fourth embodiment, a hysteresis compensation may take place directly at the measuring resistance, i.e., aluminum patches 60 may be arranged so that they lie directly on measuring resistances 41, 42. This permits compensation even it a positive baseline hysteresis already exists in the context of the original circuit inner radius (i.e., the circuit is already too close to the membrane edge). With a longitudinal resistance (edge effect predominant, i.e., compressive stress perpendicular to the current direction), a compensation strip 60 may be placed longitudinally on the resistance, since it may also produce a compressive stress but parallel to the current direction.

As stated by the equation, $$\frac{\Delta R}{R} = \pi_l \sigma + \pi_l \sigma_l,$$

the two changes act in opposite directions.

Although the micromechanical component according to the present invention has been described above with reference to preferred exemplified embodiments, it is not limited thereto and is modifiable in many ways.

In general, hysteresis compensation may be performed in different ways. On the one hand, it may occur by mask programming, e.g., by way of the contact and metal planes. As they come from the factory, the resistances may be located beneath the oxide and may be thus guaranteed inactive. They may be connected only as necessary.

On the other hand, this may be accomplished for test purposes by focused ion beam (FIB) cutting or using burn-out segments or by thyristor zapping or oxide zapping. For test purposes, the structure may be laid out on test chips so that the compensating resistances may be connected by FIB cutting. This makes possible rapid optimization on the configured sensor.

The equalization structures may also be integrated into the circuit portion. This may influence the compensating resistances by the membrane edge.

What is claimed is:

1. A micromechanical component, comprising:

a substrate including a membrane region and a surrounding region, the surrounding region surrounding the membrane region;

at least one measuring resistance disposed in the membrane region, wherein the measuring resistance is modifiable by deformation of the membrane region;

an evaluation circuit disposed in the surrounding region and including a plurality of conductor paths configured such that a deformation of the conductor paths relative to the substrate generates an interference effect on the measuring resistance; and at least one patch disposed in at least one of the surrounding region and the membrane region, the patch being configured such that a deformation of the patch relative to the substrate generates an analog interference effect, the analog interference effect compensating for the interference effect acting on the measuring resistance.

2. The micromechanical component according to claim 1, wherein the micromechanical component is a pressure sensor.

3. The micromechanical component according to claim 1, further comprising:

a compensating resistance device configured to connect at least one additional compensating resistance to the measuring resistance, wherein respective patches are disposed in the region of the compensating resistance.

4. The micromechanical component according to claim 3, wherein additional connection of at least one compensating resistance is performed selectably, wherein from a defined number of compensating resistances, a specific combination is selected that is to be additionally connected to the measuring resistance.

5. The micromechanical component according to claim 1, wherein at least one of the at least one patch is disposed in the membrane region, wherein the at least one of the at least one patch is configured to act directly on the measuring resistance.

6. The micromechanical component according to claim 1, wherein the at least one patch includes at least annular patch disposed in the surrounding region between the membrane edge and the circuit inner radius of the evaluation circuit.

7. The micromechanical component according to claim 6, wherein the at least one patch disposed in the surrounding region between the membrane edge and the circuit inner radius of the evaluation circuit is annular.

8. The micromechanical component according to claim 1, wherein the material of the at least one patch is a material of the conductor paths of the evaluation circuit.

9. The micromechanical component according to claim 1, wherein the at least one patch is disposed at least one of above and alongside an associated compensating resistance.

10. The micromechanical component according to claim 1, wherein the substrate material is silicon and the conductor path material is aluminum.

11. An equalization method for a micromechanical component, the micromechanical component comprising a substrate including a membrane region and a surrounding region, the surrounding region surrounding the membrane region, at least one measuring resistance disposed in the membrane region, the measuring resistance being modifiable by deformation of the membrane region, an evaluation circuit disposed in the surrounding region including a plurality or conductor paths configured such that a deformation of the conductor paths relative to the substrate generates an interference effect on the measuring resistance, patches disposed in at least one of the surrounding region and the membrane region, the patches being configured so that a deformation of the patch relative to the substrate generates an analog interference effect, the analog interference effect compensating for the interference effect acting on the measuring resistance, and a compensating resistance device configured so that at least one compensating resistance is connectable to the measuring resistance, respective ones of the patches being provided in a region of the at least one compensating resistance, the method comprising:

connecting select ones of the at least one compensating resistance; and optimizing the selection of the select one of the at least one compensation resistance on a test chip.

12. An equalization method for a micromechanical component, the micromechanical component comprising a substrate including a membrane region and a surrounding region, the surrounding region surrounding the membrane region, at least one measuring resistance disposed in the membrane region, the measuring resistance being modifiable by deformation of the membrane region, an evaluation circuit disposed in the surrounding region including a plurality of conductor paths configured such that a deformation of the conductor paths relative to the substrate generates an interference effect an the measuring resistance, patches disposed in at least one of the surrounding region and the membrane region, the patches being configured so that a deformation of the patch relative to the substrate generates an analog interference effect, the analog interference effect compensating for the interference effect acting on the measuring resistance, and a compensating resistance device configured so that at least one compensating resistance is connectable to the measuring resistance, respective ones of the patches being provided in a region of the at least one compensating resistance, the method comprising:

connecting select ones of the at least one compensating resistance; and optimizing the selection of the select one of the at least one compensating resistance in a final individual equalization.

* * * * *

UNITED STATES PATENT AND TRADEMARK OFFICE
CERTIFICATE OF CORRECTION

PATENT NO. : 6,782,756 B2 Page 1 of 1
DATED : August 31, 2004
INVENTOR(S) : Joerg Muchow et al.

It is certified that error appears in the above-identified patent and that said Letters Patent is hereby corrected as shown below:

Column 1,
Line 28, change "and [1I 0]" to -- and [110] --.
Line 41, change "in the [1I0] direction." to -- in the [110] direction. --.

Column 10,
Line 28, change "even it a positive baseline" to -- even if a positive baseline --.

Column 11,
Line 37, change "or conductor paths" to -- of conductor paths --.

Signed and Sealed this

Thirtieth Day of August, 2005

JON W. DUDAS
*Director of the United States Patent and Trademark Office*